United States Patent
Nakazato

(10) Patent No.: US 10,733,577 B2
(45) Date of Patent: Aug. 4, 2020

(54) PREVENTIVE MAINTENANCE MANAGEMENT SYSTEM AND METHOD FOR GENERATING MAINTENANCE SCHEDULE OF MACHINE, AND CELL CONTROLLER

(71) Applicant: FANUC CORPORATION, Yamanashi (JP)

(72) Inventor: Tomomi Nakazato, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 706 days.

(21) Appl. No.: 15/390,724

(22) Filed: Dec. 27, 2016

(65) Prior Publication Data

US 2017/0185970 A1 Jun. 29, 2017

(30) Foreign Application Priority Data

Dec. 28, 2015 (JP) ................. 2015-256906

(51) Int. Cl.
*G06Q 10/00* (2012.01)
*G06Q 10/10* (2012.01)

(52) U.S. Cl.
CPC ......... *G06Q 10/20* (2013.01); *G06Q 10/1097* (2013.01); *Y02P 90/02* (2015.11)

(58) Field of Classification Search
None
See application file for complete search history.

(56) References Cited

U.S. PATENT DOCUMENTS 5,533,413 A 7/1996 Kobayashi et al.
5,817,958 A * 10/1998 Uchida ................ G21C 7/36
73/865.9

(Continued)

FOREIGN PATENT DOCUMENTS

CN 1553989 A 12/2004
CN 101827770 A 9/2010

(Continued)

OTHER PUBLICATIONS

Satoru Goto, On-Line Residual Life Prediction Including Outlier Elimination for Condition Based Maintenance, Department of of Advanced Technology Fusion Saga University Honjomachi, Saga 840-8502, Japan. Mar. 2012, ICIC International 2012 ISSN 1349-4198, pp. 2193-2202 (Year: 2012).*

(Continued)

*Primary Examiner* — Tung S Lau
(74) *Attorney, Agent, or Firm* — Hauptman Ham, LLP

(57) ABSTRACT

A preventive maintenance management system and method, and a cell controller, for monitoring preventive maintenance data, calculating a residual period of time until which a component comes to the end of its life, and generating an appropriate maintenance schedule based thereon. The system has: a cell including machines and machine controllers, a cell controller communicably connected to each machine controller; and a supervisory computer communicably connected to the cell controller. The cell controller has: an analyzing part which detects a deterioration of the component and calculates the residual period of time when the deterioration is detected, based on the monitored preventive maintenance data; and an informing part which informs the supervisory computer of the calculated residual period of time along with an alarm. The supervisory computer has a maintenance scheduling part which generates or updates a (Continued)

maintenance schedule based on the informed residual period of time.

3 Claims, 3 Drawing Sheets

(56) References Cited

U.S. PATENT DOCUMENTS

| | | | | |
|---|---|---|---|---|
| 5,990,689 | A * | 11/1999 | Poncon | G01R 29/0835 324/627 |
| 2004/0111237 | A1 * | 6/2004 | Vlok | G05B 19/4065 702/183 |
| 2004/0148129 | A1 | 7/2004 | Gotoh et al. | |
| 2005/0085939 | A1 * | 4/2005 | Nakazato | G05B 19/19 700/173 |
| 2006/0158197 | A1 * | 7/2006 | Horikoshi | G01R 31/343 324/551 |
| 2006/0250137 | A1 | 11/2006 | Frey et al. | |
| 2009/0326890 | A1 | 12/2009 | Shetty et al. | |
| 2011/0137575 | A1 * | 6/2011 | Koul | G05B 23/0245 702/34 |
| 2011/0203276 | A1 * | 8/2011 | Friedrich | H02K 11/20 60/645 |
| 2013/0030739 | A1 | 1/2013 | Takahashi et al. | |
| 2014/0156057 | A1 | 6/2014 | Tong | |
| 2014/0163936 | A1 * | 6/2014 | Hosking | G06Q 10/0635 703/2 |
| 2015/0207347 | A1 | 7/2015 | Hori et al. | |

FOREIGN PATENT DOCUMENTS

| | | |
|---|---|---|
| CN | 102834727 A | 12/2012 |
| CN | 103548234 A | 1/2014 |
| CN | 103853101 A | 6/2014 |
| JP | 3-113511 A | 5/1991 |
| JP | 10-161733 A | 6/1998 |
| JP | 2001-306131 A | 11/2001 |
| JP | 2002-123314 A | 4/2002 |
| JP | 2003-36320 A | 2/2003 |
| JP | 2003-150237 A | 5/2003 |
| JP | 2004-62276 A | 2/2004 |
| JP | 2004-202624 A | 7/2004 |
| JP | 2006-309279 A | 11/2006 |
| JP | 2008-50965 A | 3/2008 |
| JP | 2013-92405 A | 5/2013 |
| JP | 2014-21627 | 2/2014 |
| JP | 2014-167667 A | 9/2014 |
| JP | 2014-174680 A | 9/2014 |
| JP | 2015-114778 A | 6/2015 |

OTHER PUBLICATIONS

Michael Andreas Herzog, Machine and Component Residual Life Estimation through the Application of Neural Networks, 161 pages (Year: 2006).*

Stanislav Novak, Nuclear power plant ageing and life extension: Safety aspects, 3 pages (Year: 1987).*

M-Y You, Residual life prediction of repairable systems subject to imperfect preventive maintenance using extended proportional hazards model, 14 pages (Year: 2010).*

Inma Castro, A predictive maintenance strategy based on mean residual life for systems subject to competing failures due to degradation and shocks, 11 pages (Year: 2013).*

Kimito Idemori: "Intelligent Remote Maintenance System", Toshiba Review, Sep. 1, 2008, vol. 63, No. 9, pp. 58-59.

* cited by examiner

PREVENTIVE MAINTENANCE MANAGEMENT SYSTEM AND METHOD FOR GENERATING MAINTENANCE SCHEDULE OF MACHINE, AND CELL CONTROLLER

RELATED APPLICATIONS

The present application claims priority to Japanese Patent Application Number 2015-256906 filed Dec. 28, 2015, the disclosure of which is hereby incorporated by reference herein in its entirety.

BACKGROUND OF THE INVENTION

1. Field of the Invention

The preset invention relates to a preventive maintenance management system and method for monitoring preventive maintenance data of a machine and generating a maintenance schedule for the machine, and relates to a cell controller included in the system.

2. Description of the Related Art

In a system (such as a production system) including a plurality of machines, each machine may be operated by a plurality of numerical controllers for controlling the respective machines, based on a command from a supervisory computer. As a relevant prior art document, JP 2004-202624 A discloses a method and a device for periodically collecting information from a plurality of robots connected to a network, and accumulating a status of each robot in a database. JP 2004-202624 A also describes that, when a malfunction occurs in one robot, it can be judged as to which robot will have a malfunction, based on information of a previously registered robot and information obtained in real-time.

Further, JP 2004-062276 A discloses a device information delivery unit having a means for periodically collecting device information of a machine tool or a measurement device at predetermined time intervals, accumulating the collected device information associated with a timing of the collection in a database, and transmit the accumulated device information to external equipment.

On the other hand, there is a conventional device having a function for informing an operator of when each component used in a machine tool should be checked. For example, JP 2014-174680 A discloses a numerical controller having such a function.

JP 2003-036320 A discloses a component information processing system including: an accumulating means which accumulates operational conditions of replaceable components in a device as accumulated operational information; a life information storing means which stores life information representing operational limits in operating the replaceable components; an operation-for-a-period information storing means that stores operation-for-a-period information representing operational conditions of the replaceable components over a predetermined period of time; a replacement timing calculating means which calculates timing when the replaceable components must be replaced based on the operation-for-a-period information, the accumulated operational information and the life information; and an outputting means which outputs the calculated timing of the replacement.

Further, JP 2002-123314 A discloses an optimization system for maintenance of a plant, including (1) a means for analyzing and quantitatively evaluating material deterioration, corrosion trends, etc., by high-level technology as to secular changes of plant equipment materials, and also quantitatively evaluating a fault of operating equipment based on failure mode effect analysis; (2) a means for quantitatively specifying maintenance portions based on the quantitative evaluation; and (3) a means for setting an occurrence frequency of a fault and a degree of influence of the fault by using an influence degree evaluating method, and evaluating (the frequency*the influence degree) as a risk.

In the prior art, in many cases, the replacement of a component of each machine due to deterioration thereof is carried out by an operator, when used hours of the component exceeds a predetermined period of time, since the component can be considered to be deteriorated in such a case. However, in such a method in which the component is replaced after the predetermined of period of time has elapsed, a component which is not actually deteriorated may be replaced, which is very wasteful.

In another conventional method, a numerical controller outputs an alarm, etc., for demanding the replacement of a component to the outside (or an operator), based on a condition such as a threshold relating to the deterioration of the component. However, in some cases, a (residual) period of time until the component comes to the end of its life (or becomes unusable) is very short. In such a case, the component may become unusable before the replacement operation for the component is finished, even though the operator starts the replacement operation after the alarm is output, whereby a productive efficiency, etc., may be significantly lowered. In the technique of JP 2004-202624 A or JP 2004-062276 A, such a residual period of time is not calculated.

On the other hand, in JP 2014-174680 A, although the numerical controller calculates the time intervals for checking the component and outputs them to the outside, the residual period of time as described above is not calculated or output. In JP 2003-036320 A, the life of the component is calculated based on the operation information thereof, not on the actual status of the component. Therefore, if the actual life of the component is significantly deviated from the life information in the past, it is difficult to replace the component at an appropriate timing. Further, in JP 2002-123314 A, although the deterioration or corrosion of the plant equipment material is quantitatively evaluated and the maintenance portion is specified so as to evaluate the risk, the residual period of time is not correctly calculated based on the actual status of the component.

SUMMARY OF THE INVENTION

Therefore, an object of the present invention is to provide a preventive maintenance management system and method, wherein preventive maintenance data is monitored, a residual period of time until which a component comes to the end of its life can be precisely calculated, and an appropriate maintenance schedule can be generated based thereon, and also provide a cell controller included in the system.

One aspect of the present invention provides a preventive maintenance management system, comprising: at least one machine; at least one machine controller which controls the machine; a cell controller communicably connected to the machine controller; and a supervisory computer communicably connected to the cell controller, wherein the cell controller has: an analyzing part which monitors preventive maintenance data of the machine received from the machine controller at predetermined time intervals, detects a deterioration of a component of the machine associated with the preventive maintenance data, based on the monitored preventive maintenance data, and calculates a residual period of time until the component comes to an end of its life when the deterioration is detected, based on the preventive maintenance data; and an informing part which informs the supervisory computer of the residual period of time calculated by the analyzing part, along with an alarm which represents that the deterioration is detected, and wherein the supervisory computer has a maintenance scheduling part which generates or updates a maintenance schedule including an replacement operation for the component based on the residual period of time.

In a preferred embodiment, the analyzing part continues to monitor the preventive maintenance data after the deterioration is detected, and recalculates the residual period of time based on the monitored preventive maintenance data, the informing part informs the supervisory computer of the residual period of time recalculated by the analyzing part, and the maintenance scheduling part updates the maintenance schedule based on the recalculated residual period of time. In this case, the analyzing part may decrease the time interval at which the preventive maintenance data is monitored after the deterioration is detected, as a rate of change in the preventive maintenance data is increased.

Another aspect of the present invention provides a cell controller communicably connected to a machine controller for controlling a machine, the cell controller comprising: an analyzing part which monitors preventive maintenance data of the machine received from the machine controller at predetermined time intervals, detects a deterioration of a component of the machine associated with the preventive maintenance data, based on the monitored preventive maintenance data, and calculates a residual period of time until the component comes to an end of its life when the deterioration is detected, based on the preventive maintenance data.

In a preferred embodiment, the cell controller further comprises an informing part which informs a supervisory computer of the residual period of time calculated by the analyzing part, along with an alarm which represents that the deterioration is detected, the supervisory computer having a maintenance scheduling part which generates or updates a maintenance schedule including an replacement operation for the component based on the residual period of time.

In a preferred embodiment, the analyzing part continues to monitor the preventive maintenance data after the deterioration is detected, and recalculates the residual period of time based on the monitored preventive maintenance data. In this case, the analyzing part may decrease the time interval at which the preventive maintenance data is monitored after the deterioration is detected, as a rate of change in the preventive maintenance data is increased.

Still another aspect of the present invention provides a preventive maintenance management method, comprising the steps of: monitoring preventive maintenance data of a machine; detecting a deterioration of a component of the machine associated with the preventive maintenance data, based on the monitored preventive maintenance data; calculating a residual period of time until the component comes to an end of its life when the deterioration is detected, based on the preventive maintenance data; and generating or updating a maintenance schedule including an replacement operation for the component based on the calculated residual period of time.

In a preferred embodiment, the preventive maintenance management method comprises the steps of continuing to monitor the preventive maintenance data after the deterioration is detected, and recalculating the residual period of time based on the monitored preventive maintenance data. In this case, the time interval, at which the preventive maintenance data is monitored after the deterioration is detected, may be decreased as a rate of change in the preventive maintenance data is increased.

Still another aspect of the present invention provides a non-transitory computer readable medium, which stores a program executed by a computer, by which the computer monitors preventive maintenance data of a machine received from a machine controller at predetermined time intervals, detects a deterioration of a component of the machine associated with the preventive maintenance data, based on the monitored preventive maintenance data, calculates a residual period of time until the component comes to an end of its life when the deterioration is detected, based on the preventive maintenance data, and outputs the calculated residual period of time and an alarm which represents that the deterioration is detected.

In a preferred embodiment, the program includes that computer continues to monitor the preventive maintenance data after the deterioration is detected, and recalculates the residual period of time based on the monitored preventive maintenance data. In this case, the program may include that the computer decreases the time interval at which the preventive maintenance data is monitored after the deterioration is detected, as a rate of change in the preventive maintenance data is increased.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
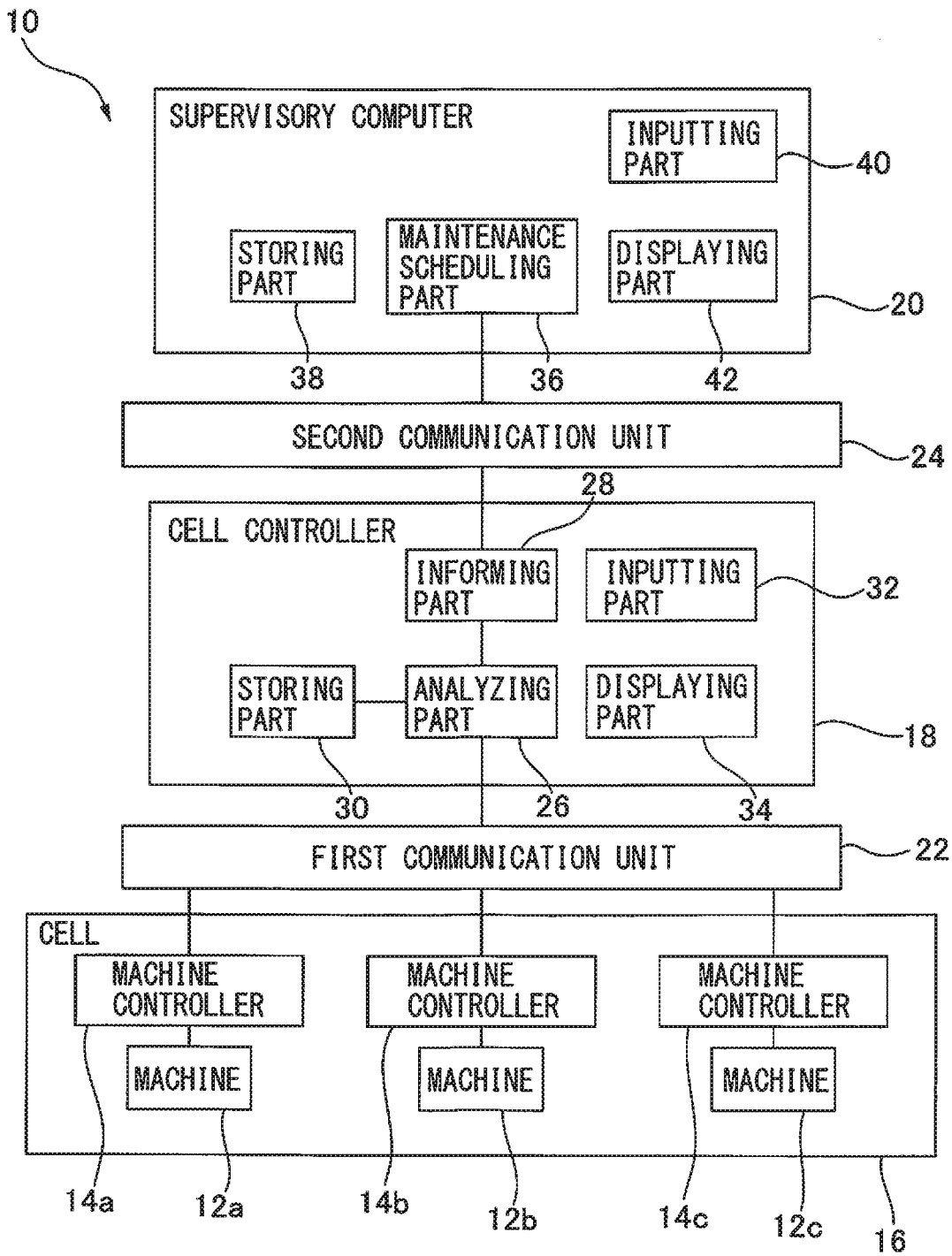
FIG. 1 is a block diagram showing a schematic configuration of a preventive maintenance management system according to a preferred embodiment of the present invention.

Hereinafter, a preferred embodiment of the present invention will be explained with reference to the drawings. FIG. 1 is a block diagram showing a schematic configuration of a preventive maintenance management system 10 according to a preferred embodiment of the present invention. Preventive maintenance management system 10 has: a cell 16 including at least one, preferably, a plurality of (in the illustrated embodiment, three) machines 12a, 12b and 12c, and at least one (normally, the same number as the machines) machine controllers (or numerical controllers) 14a, 14b and 14c which control respective machines 12a, 12b and 12c; a cell controller 18 configured to communicate with each of machine controllers 14a, 14b and 14c; and a supervisory (or higher-level) computer 20 configured to communicate with cell controller 18.

Cell 16 is a group of a plurality of machines for carrying out a predetermined operation. For example, each of machines 12a, 12b and 12c may be a machine tool, a (multi-joint) robot or a production machinery, and the machines may be identical to or different from each other.

Machine controllers 14a, 14b and 14c are configured to control the motion of machines 12a, 12b and 12c, respectively, and transmit preventive maintenance data measured in each machine to cell controller 18. In this regard, the preventive maintenance data includes a value representing a characteristic and/or performance of a component of each machine, which is required to be replaced or maintained at an appropriate frequency. Concretely, the preventive maintenance data may include a value of insulation resistance of an axis or a motor for driving a movable part of each machine, a voltage of a battery, and a rotational frequency of a cooling fan motor, etc., which may be gradually varied (in many cases, decreased) as the corresponding component is deteriorated.

In this embodiment, cell 16 may be installed in a factory, etc., for manufacturing a product, on the other hand, cell controller 18 and supervisory computer 20 may be installed in a building, etc., which is different from the factory. In this case, cell controller 18 and each of machine controllers 14a, 14b and 14c can be connected to each other by a network (or a first communication unit 22) such as an intranet. On the other hand, supervisory computer 20 may be installed in an office, etc., which is different from the factory. In this case, supervisory computer 20 may be communicably connected to cell controller 18 by a network (or a second communication unit 24) such as an internet. However, the present invention is not limited as such, and thus first communication unit 22 may be any device as long as it communicably connects cell controller 18 to each of machine controllers 14a, 14b and 14c. Also, second communication unit 24 may be any device as long as it communicably connects cell controller 18 to supervisory computer 20.

Cell controller 18 is configured to control cell 16, concretely, transmit a command to each of machine controllers 14a, 14b and 14c, and/or obtain an operational status (including the preventive maintenance data as described above) of each of machines 12a, 12b and 12c from machine controllers 14a, 14b and 14c, respectively. In detail, as shown in FIG. 1, cell controller 18 has: an analyzing part 26 which monitors the preventive maintenance data of each machine received from each machine controller at predetermined time intervals, detects a deterioration of a component (e.g., a battery or a motor) of the machine associated with the preventive maintenance data, based on the monitored preventive maintenance data, and calculates a residual period of time until the component comes to an end of its life when the deterioration is detected, based on the preventive maintenance data; and an informing part 28 which informs supervisory computer 20 of the residual period of time calculated by analyzing part 26, along with an alarm which represents that the deterioration is detected.

Also, cell controller 18 may have a storing part 30, such as a memory, configured to store the data monitored or analyzed by analyzing part 26. Cell controller 18 may also have an inputting part 32 configured to receive an input from an operator or another device, and a displaying part 34 configured to display information received by inputting part 32 and/or contents processed by analyzing part 26.

For example, supervisory computer 20 is a personal computer, and is configured to generate or plan a maintenance schedule based on the alarm and the residual period of time received from cell controller 18, by which a maintenance operation such as replacement of the component can be completed within the residual period of time. In detail, as shown in FIG. 1, supervisory computer 20 has a maintenance scheduling part 36 which generates or updates a maintenance schedule including an replacement operation for the component based on the residual period of time received from cell controller 18. Also, supervisory computer 20 may have a storing part 38, such as a memory, configured to store the maintenance schedule, etc., generated or updated by maintenance scheduling part 36. Supervisory computer 20 may also have an inputting part 40 configured to receive an input from the operator or another device, and a displaying part 42 configured to display information received by inputting part 40 and/or contents processed by maintenance scheduling part 36.

Figure 2:
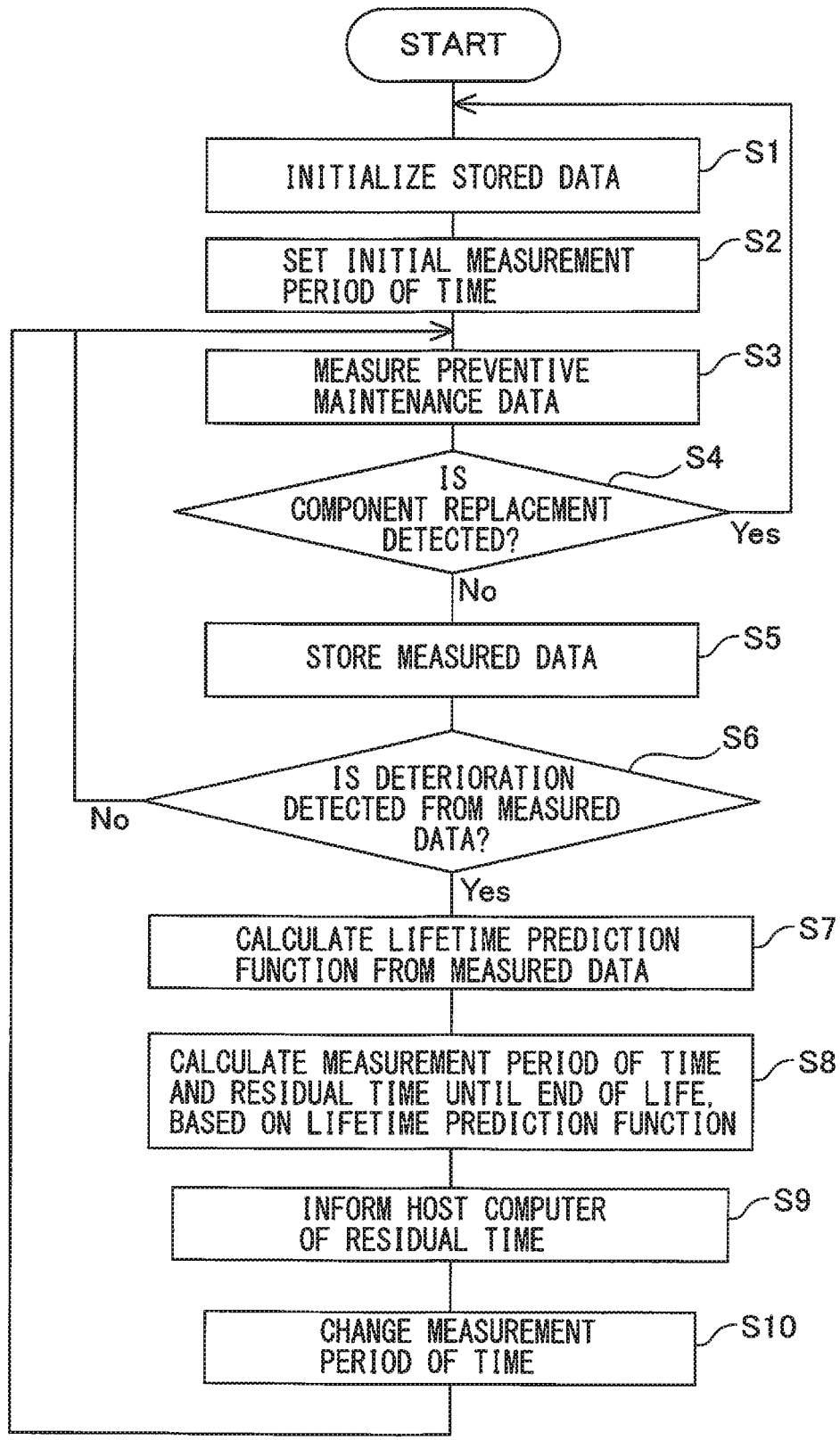
FIG. 2 is a flowchart showing an example of a procedure in the preventive maintenance management system of FIG. 1.
Figure 3:
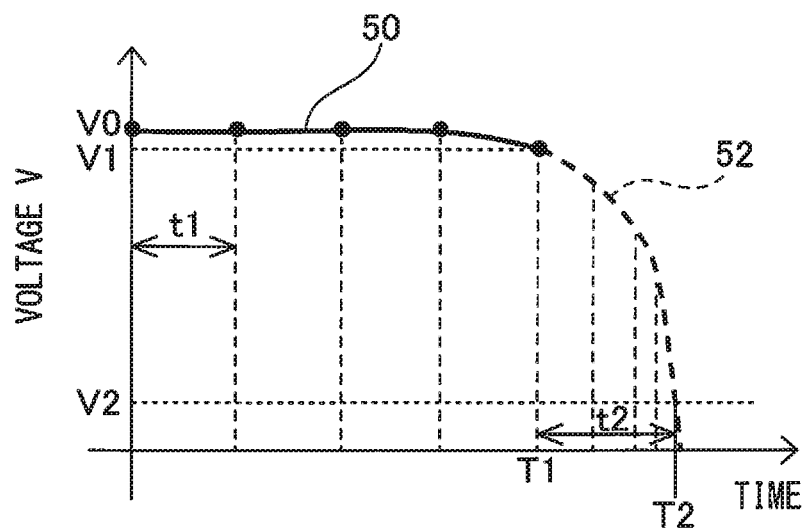
FIG. 3 is a graph explaining an example of a procedure for calculating a residual period of time based on measurement data of a battery voltage, included in preventive maintenance data.

FIG. 2 is a flowchart showing an example of a procedure mainly in cell controller 18, and FIG. 3 is a graph explaining an example of a procedure for calculating the residual period of time based on the preventive maintenance data (in this example, a voltage of the battery). First, the preventive maintenance data stored in storing part 30, etc., of cell controller 18 is initialized (step S1), and a period of time for measuring the preventive maintenance data is set to a predetermined initial measurement period (step S2). In the example of FIG. 3, the initial measurement period corresponds to a cycle t1 (for example, twenty-four hours) at which the battery voltage is automatically measured when the battery is normal (i.e., before the battery is deteriorated).

Next, in step S3, the preventive maintenance data (in this case, the battery voltage of each machine) is measured at the initialized measurement period of time determined in step S2 or an updated measurement period of time as described below. In this regard, when the objective component (the battery in this case) relating to the preventive maintenance data has already been exchanged (i.e., the measured value of the battery voltage is restored to its initial value), the procedure is returned to step S1 (step S4).

Next, after the measurement data is stored (step S5), it is automatically judged as to whether or not the deterioration of the battery has been detected (step S6). In the example of FIG. 3, as indicated by a solid-line graph 50, when a measured value V of the battery voltage, from which a predetermined margin is subtracted, falls below an initial or normal value V0 (for example, when V falls below a threshold V1 corresponding to 90% of V0), it can be judged that the deterioration of the battery occurs. On the other hand, when the measured value of the battery voltage is not less than the threshold, the procedure is returned to step S3.

When the deterioration of the battery is detected in step S6 (for example, time point T1 of FIG. 3), a lifetime prediction function (or an approximate curve) representing a future change in the battery voltage is automatically calculated, as exemplified by a dashed-line graph 52 (step S7). Then, a residual period of time t2, from when the deterioration is detected to when the measured value is lowered to a voltage V2 at which the battery must be replaced (at time point T2 in FIG. 3), is automatically calculated (step S8). The calculated residual period of time is automatically transmitted from cell controller 18 to supervisory computer 20, along with an alarm which represents that the deterioration is detected (step S9). Supervisory computer 20 generates or plans a maintenance schedule for specifying as to when the replacement operation for the component of each machine of cell 16 should be carried out, based on the residual period of time received from cell controller 18.

As shown in FIG. 3, the measured value of the battery voltage is likely to be rapidly changed after the deterioration of the battery is started. Therefore, it is preferable that the measurement period of time is changed (lowered) after the deterioration be detected while measuring or monitoring the battery voltage (step S10->step S3), and the residual period of time be automatically recalculated (in other words, the lifetime prediction function be automatically updated). By virtue of this, supervisory computer 20 can successively receive the more precise lifetime prediction function from cell controller 18 after the deterioration is detected, and can generate or update the preventive maintenance schedule based on the more precise residual period of time.

The measurement period of time may be changed by the input from the operator to cell controller 18. Otherwise, in terms of labor-saving, in step S7, for example, it is preferable that cell controller 18 automatically calculate a new measurement period of time, as well as the residual period of time. In this regard, the new measurement period of time is required to be lowered as the rate of change in the preventive maintenance data. Therefore, for example, the measurement period of time may be calculated by using a function by which the measurement period of time is lowered as the rate of change in the measured value of the battery voltage as shown in FIG. 3 is high. In the example of FIG. 3, the battery voltage is measured or monitored once in a day (or twenty-four hours) before the deterioration is detected, and then, after the deterioration is detected, the measurement period is gradually lowered to twelve hours, eight hours, four hours, etc., corresponding to a gradient of dashed-line graph 52.

The lifetime prediction function may be experimentally determined based on the past measurement data. In the embodiment, the lifetime prediction function is successively updated by obtaining the measurement data after the deterioration is detected. Therefore, even when the accuracy of the lifetime prediction function generated immediately after the deterioration is detected is relatively low, supervisory computer 20 can update the maintenance schedule based on the successively updated prediction function (or residual period of time), whereby the probability that the operator carries out the replacement operation based on an inappropriate maintenance schedule can be significantly lowered.

Figure 4:
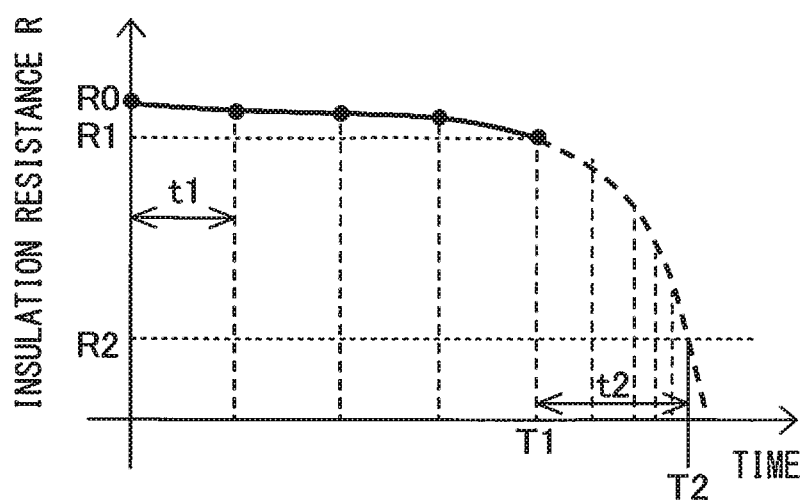
FIG. 4 is a graph explaining an example of a procedure for calculating a residual period of time based on measurement data of an insulation resistance of a motor, included in the preventive maintenance data.

FIG. 4 is similar to FIG. 3, and shows a graph explaining an example of a procedure for calculating a residual period of time based on automatically measured data of an insulation resistance R representing a degree of insulation deterioration of a motor of the machine, as another example of the preventive maintenance data. Basically, the example of FIG. 4 is similar to the example of FIG. 3, except that the object to be measured is changed from the battery voltage to the insulation resistance, and that initial voltage V0, threshold V1 for detecting the deterioration and voltage V2 at which the replacement operation is necessary are changed to an initial resistance value R0, a threshold R1 and a resistance value R2, respectively. In addition, the object to be replaced is the battery in the example of FIG. 3, while the object to be replaced is the motor in the example of FIG. 4.

As a modification of the embodiment, in the flowchart of FIG. 2, step S6 for detecting the deterioration may be moved after step S9, i.e., after the calculated residual period of time is transmitted to the supervisory computer. By virtue of this, the residual period of time can be calculated before the deterioration is detected, whereby the maintenance schedule can be generated in the early stages.

As explained above, cell controller 18 obtains and monitors the preventive maintenance data of each of machines 12a, 12b and 12c at predetermined time intervals from machine controllers 14a, 14b and 14c, respectively. When cell controller 18 judges that the monitored data represents the deterioration or a sign of the deterioration of the component associated with the data, cell controller 18 calculates the residual period of time which represents as to when the replacement or maintenance operation of the component should be carried out. Then, cell controller 18 transmits the calculated residual period of time to supervisory computer 20 along with the alarm. Accordingly, in the previously generated maintenance schedule, supervisory computer 20 can add or update the replacement operation of the component which can be carried out within the informed residual period of time. The residual period of time as calculated above represents a lifetime of each component while taking the individual difference between the components into consideration, and thus the needless replacement of the component can be avoided relative to the prior art in which the replacement cycle of each component is uniformly specified. Further, the prediction of the lifetime and the generation of the maintenance schedule based on the predicted lifetime can be automatically carried out, the burden of the operator is not increased. Therefore, due to the embodiment of the invention, the assured and effective preventive maintenance can be carried out, by the rationalized preventive maintenance schedule and the optimized time for replacing the component.

In the above embodiment, the series of processes (i.e., the preventive maintenance data of machines 12a, 12b and 12c received from machine controllers 14a, 14b and 14c at the predetermined time intervals; the deterioration of the component of the machine associated with the preventive maintenance data is detected based on the monitored preventive maintenance data; the residual period of time until the component comes to the end of its life is calculated when the deterioration is detected, based on the preventive maintenance data; and the residual period of time calculated by the analyzing part is informed or output along with the alarm which represents that the deterioration is detected) can be executed by a computer (in this case, cell controller 18 or supervisory computer 20) by using a program. The program can be stored in a non-transitory computer readable medium such as a CD-ROM.

Further, the other processes as describe above (e.g., the preventive maintenance data is continued to be monitored after the deterioration is detected, and the residual period of time is recalculated based on the monitored preventive maintenance data; and the time interval at which the preventive maintenance data is monitored is decreased after the deterioration is detected, as a rate of change in the preventive maintenance data is increased) can be executed by the computer by using a program. The program can also be stored in the non-transitory computer readable medium.

According to the present invention, the component of the machine can be replaced at an appropriate timing based on the automatically calculated residual period of time based on the monitored preventive maintenance data, whereas the component is replaced after a fixed period of time has elapsed in the prior art. Therefore, in the present invention, the preventive maintenance can be assuredly and effectively carried out.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A preventive maintenance management system, comprising:
   at least one machine;
   at least one machine controller which controls the machine;
   a cell controller communicably connected to the machine controller; and
   a supervisory computer communicably connected to the cell controller,
   wherein the cell controller has:
      an analyzing part which monitors preventive maintenance data of the machine received from the machine controller at predetermined time intervals, detects a deterioration of a component of the machine associated with the preventive maintenance data, based on the monitored preventive maintenance data, and calculates a residual period of time until the component comes to an end of its life when the deterioration is detected, based on the preventive maintenance data; and
      an informing part which informs the supervisory computer of the residual period of time calculated by the analyzing part, along with an alarm which represents that the deterioration is detected,
   wherein the supervisory computer has a maintenance scheduling part which generates or updates a maintenance schedule including a replacement operation for the component based on the residual period of time,
   wherein the component includes a motor of the machine,
   wherein the analyzing part continues to monitor the preventive maintenance data after the deterioration is detected, and recalculates the residual period of time based on the monitored preventive maintenance data,
   wherein the informing part informs the supervisory computer of the residual period of time recalculated by the analyzing part,
   wherein the maintenance scheduling part updates the maintenance schedule based on the recalculated residual period of time, and
   wherein the analyzing part decreases the predetermined time interval at which the preventive maintenance data is monitored after the deterioration is detected, as a rate of change in the preventive maintenance data is increased.

2. A cell controller communicably connected to a machine controller for controlling a machine, the cell controller comprising:
   an analyzing part which monitors preventive maintenance data of the machine received from the machine controller at predetermined time intervals, detects a deterioration of a component of the machine associated with the preventive maintenance data, based on the monitored preventive maintenance data, and calculates a residual period of time until the component comes to an end of its life when the deterioration is detected, based on the preventive maintenance data,
   an informing part which informs a supervisory computer of the residual period of time calculated by the analyzing part, along with an alarm which represents that the deterioration is detected, the supervisory computer having a maintenance scheduling part which generates or updates a maintenance schedule including a replacement operation for the component based on the residual period of time,
   wherein the analyzing part continues to monitor the preventive maintenance data after the deterioration is detected, and recalculates the residual period of time based on the monitored preventive maintenance data,
   wherein the informing part informs the supervisory computer of the residual period of time recalculated by the analyzing part, for the maintenance scheduling part to update the maintenance schedule based on the recalculated residual period of time,
   wherein the analyzing part decreases the predetermined time interval at which the preventive maintenance data is monitored after the deterioration is detected, as a rate of change in the preventive maintenance data is increased, and
   wherein the component includes a motor of the machine.

3. A non-transitory computer readable medium, which stores a program executable by a computer to cause the computer to:
   monitor preventive maintenance data of a machine received, at predetermined time intervals, from a machine controller controlling the machine,
   detect a deterioration of a component of the machine associated with the preventive maintenance data, based on the monitored preventive maintenance data,
   calculate a residual period of time until the component comes to an end of its life when the deterioration is detected, based on the preventive maintenance data,
   output, to a supervisory computer communicably connected to the computer, the calculated residual period of time and an alarm which represents that the deterioration is detected, for generating or updating, by the supervisory computer, a maintenance schedule including a replacement operation for the component based on the calculated residual period of time,
   continue to monitor the preventive maintenance data after the deterioration is detected,
   recalculate the residual period of time based on the monitored preventive maintenance data,
   output, to the supervisory computer, the recalculated residual period of time, for updating, by the supervisory computer, the maintenance schedule based on the recalculated residual period of time, and
   decrease the predetermined time interval at which the preventive maintenance data is monitored after the deterioration is detected, as a rate of change in the preventive maintenance data is increased,
   wherein the component includes a motor of the machine.

* * * * *